(12) United States Patent
Foti

(10) Patent No.: US 8,452,878 B2
(45) Date of Patent: May 28, 2013

(54) CONTENT SHARING FOR SOCIAL ENGAGEMENT

(75) Inventor: George Foti, Dollard-des-Ormeaux (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 191 days.

(21) Appl. No.: 12/893,578

(22) Filed: Sep. 29, 2010

(65) Prior Publication Data

US 2012/0079120 A1 Mar. 29, 2012

(51) Int. Cl.
*G06F 15/16* (2006.01)
(52) U.S. Cl.
USPC .......................................... 709/227; 709/231
(58) Field of Classification Search
None
See application file for complete search history.

(56) References Cited

U.S. PATENT DOCUMENTS

| 8,032,589 B2* | 10/2011 | Foti ............................... 709/203 |
| 2006/0236352 A1 | 10/2006 | Scott, III |
| 2008/0155062 A1* | 6/2008 | Rabold et al. ................. 709/219 |
| 2009/0307736 A1* | 12/2009 | Lindquist et al. ............. 725/110 |
| 2010/0005517 A1 | 1/2010 | Foti |
| 2011/0162021 A1* | 6/2011 | Lee ................................. 725/93 |
| 2011/0277004 A1* | 11/2011 | Hwang et al. ................. 725/108 |

OTHER PUBLICATIONS

3GPP TSG SA WG2 Meeting #72, TD S2-091958, Clarify determining the capabilities of an UE to act as Controller/Controllee UE, Nokia, Telecom Italia, Mar. 30-Apr. 3, 2009, Hangzhou, China, pp. 1-7.
PCT Search Report from corresponding application PCT/IB2011/054255.

\* cited by examiner

*Primary Examiner* — John B. Walsh
(74) *Attorney, Agent, or Firm* — Dilip C. Andrade; Ericsson Canada Inc.

(57) ABSTRACT

A user is provided the ability to request through a set top box or other terminal that a media session be replicated to another terminal. The control channel associated with the replicated media session is assigned to the requesting terminal so that the user of the requesting terminal can control the playback experience of a plurality of different terminals.

20 Claims, 7 Drawing Sheets

CONTENT SHARING FOR SOCIAL ENGAGEMENT

TECHNICAL FIELD

This disclosure relates to allowing one use to control content display to a plurality of users in different sessions.

BACKGROUND

Television programming was originally broadcast to viewer's television sets through a radio wave transmission in a defined frequency band referred to as a channel. Different people in different places could receive the same broadcast signal by tuning in to the same channel.

As technology progressed, these broadcast signals were retransmitted over a common access cable infrastructure. These scenarios are illustrated in FIGS. 1a and 1b. In FIG. 1a, broadcast tower 100 transmits a program to televisions 102 through radio waves over channel 104. Other towers, not shown, can transmit other programs over different channels. In some setups, different transmitters use the same physical tower but transmit on different channels. In FIG. 1b, tower 100 still transmits to television 102 over channel 104, but can also have its programming carried by cable infrastructure 106 to television 102b.

As technology has provided new, or improved, delivery mechanisms they have been employed to allow for improved or enhanced television experiences. With the arrival of packet based data networks, and the processing power to properly encode and decode video data at sufficiently high frame rates, Internet Protocol TV (IPTV) is making inroads. IPTV employs a packed based delivery network where infrastructure elements are employed to verify that a given use is authorized to access content before the requested content is delivered to the user.

In packet based networks, broadcasting data is not typically done. Instead data is either sent to a specific node (unicast) or sent to a plurality of nodes (multicast). Many users can join a multicast session, and from the user perspective, this may not show any differences from a conventional broadcast.

In many conventional IPTV environments, the network is built upon an Internet Multimedia subsystem (IMS) based network employing Session Initiation Protocol (SIP) as a control channel protocol. SIP commands are employed to provide control over the initiation and termination of other sessions. One benefit of SIP is that a node in the network can initiate a session between two other nodes without needing to participate in the resulting session.

Typically, the SIP session is used to create a Real Time Streaming Protocol (RTSP) session which in turn is used to create a delivery channel, typically using a protocol such as the Real-time Transport Protocol (RTP) between a content source and the Open IPTV Terminal Function (OITF) which is often provided in the form of a set top box (STB). The RTSP session is used to provide the user with playback controls for the content delivered in another channel, called the delivery channel. The packets containing the actual video content are not delivered through the RTSP session, but instead are delivered in the delivery channel using another protocol such as the Real-time Transport Protocol (RTP) or other protocols determined to be appropriate to the particular implementation.

Thus, the content is delivered as packets using a protocol such as RTP in a session controlled by RTSP. Such a setup is shown in FIG. 2, where an OITF 110 and a Content Delivery Function (CDF) 114 have an RTSP Session 118. This RTSP session 118 is established indirectly through the SIP session 116 established between OITF 110 and IPTV CS 112. SIP session 116 is used to invoke and tear down RTSP session 118, as well as to perform other session management functions. RTSP session 118 is used to invoke and tear down RTP session 120 as well as to perform media control actions relevant to the content delivered through RTP session 120.

The content is delivered to OITF 110 through RTP session 120. As described above, the user can issue, from OITF 110, RTSP commands such as PAUSE, PLAY, and RECORD in RTSP session 118.

A variety of enhancements to distribution of content have been enabled through IPTV. One such enhancement is the ability of a user to perform session replication. A user can replicate a session through a series of SIP commands that will be well understood by those skilled in the art. This allows a user to create a second set of sessions between the CDF and a second OITF (typically through SIP commands involving the IPTV CS). This replication creates a second set of session independent of the first set. Often the replication is performed using SIP commands that may also involve causing the first OITF to issue RTSP commands (e.g. PAUSE) at the start of the replication procedure, and causing both OITFs to issue RTSP commands (e.g. PLAY) at the completion of the replication operation.

One of the results of the evolution of television content delivery being aimed at ensuring that viewers have a consistent experience, is that many of the manners in which viewers interact with each other and the experience of watching television has remained relatively constant. Content is still consumed in isolation or with a group of people who are gathered in a single location. A viewer, with access to a controller, can guide or control the viewing experience of the gathered group through the ability to pause a session, to rewind a session, or otherwise control the playback of the content. This sort of experience has allowed and encouraged groups of people to gather to watch sporting events and other programming that may be considered to be cultural touchstones such as the finale to a popular television show.

With the growth of social media, viewers have taken to attempting a communal viewing experience with people that they are not closely located to by using social media messaging to share comments about a program. This clearly demonstrates the desire of many users to explore and experience the social aspects of the television viewing experience without concern about the geographic co-location of the individuals.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method of enabling sharing of a content session between two terminals. The method comprises the steps of initiating content delivery and content control sessions for a primary terminal; receiving instructions from the primary terminal to share the content delivery session with a secondary terminal; replicating the content delivery session for the secondary terminal; and providing the primary terminal with control of the replicated content delivery session.

In an embodiment of the first aspect of the present invention, the terminals are Open Internet Protocol Television Terminal Functions (OITF). In another embodiment the step of receiving instructions is preceded by receiving, from the primary terminal, a request for a list of terminals with which the media session can be shared; and transmitting to the primary terminal the requested list. In a further embodiment, the step of receiving instructions includes receiving a Session Initiation Protocol (SIP) message from the primary terminal, and optionally wherein the SIP message is a SIP re-INVITE message. In another embodiment, the step of replicating the content delivery session includes performing third party call control between the secondary terminal and a content delivery network, and optionally the step of providing includes assigning a content control session associated with the replicated content delivery session to the primary terminal. The step of providing the primary terminal with control of the replicated content delivery session can include transmitting to the primary terminal an identifier for a Real Time Streaming Protocol session associated with the replicated content delivery session, and optionally can include transmitting an identification of a Content Delivery Function associated with the replicated content delivery session to the primary terminal. In yet another embodiment, the step of replicating the media session includes replicating all sessions associated with the media session initiated with the primary terminal for the secondary terminal, and optionally includes obtaining a session identifier from the secondary terminal and transmitting the obtained identifier to the primary terminal. In a further embodiment, the step of replicating the content delivery session includes instructing a media resource function to replicate the content delivery session and direct the replicated content delivery session to the secondary terminal, the replicated content delivery session being controlled by the content control session.

In a second aspect of the present invention, there is provided a method of enabling sharing of a content delivery session with another terminal. The method comprises initiating content delivery and content control sessions with a content delivery network; selecting a secondary terminal with which to share the initiated content delivery session; initiating replication of the content delivery session for assignment to the secondary terminal; and receiving identification of a content control session associated with the replicated content delivery session.

In an embodiment of the second aspect of the present invention, the step of initiating content delivery and content control sessions includes issuing a Session Initiation Protocol (SIP)-based command to an Internet Protocol Television Control Server (IPTV CS); having a content control session with the content delivery network established by the IPTV CS; and having a content delivery session with the content delivery network established by the content control session. The step of selecting a secondary terminal can optionally include requesting, from the IPTV CS, a list of terminals with which the content delivery session can be shared; receiving, from the IPTV CS, the requested list; and selecting the secondary terminal from the received list. In a further embodiment, the step of initiating replication includes issuing a Session Initiation Protocol based request to an IPTV CS to replicate the content control and content delivery sessions. In a further embodiment, the step of initiating replication includes pushing a session replication to the selected secondary terminal. In another embodiment, the step of initiating replication includes requesting that the secondary terminal initiate a pull based session replication. In a further embodiment, the step of initiating replication includes requesting that the content delivery network replicate the content delivery session for the secondary terminal, and wherein the step of receiving identification includes receiving confirmation that the replicated content delivery session is controlled by the content control session. In another embodiment, the step of receiving includes receiving a SIP based message from an IPTV CS containing a Real Time Streaming Protocol session id. Optionally, the step of receiving can include receiving identification of a Content Delivery Function associated with the replicated content delivery session. In another embodiment, the step of receiving includes receiving the SIP based message in a hypertext transfer protocol message, and optionally where the received message was initiated by the secondary terminal.

In a third aspect of the present invention, there is provided an Open Internet Protocol Terminal Function (OITF) device. The OITF device comprises a user interface, an Internet Protocol Television Control Server (IPTV CS) interface; a content delivery network interface and a processor. The user interface receives user instructions to initiate content delivery session sharing. The IPTV CS interface transmits content delivery session replication instructions to an IPTV CS, and receives a content control session identifier associated with a replicated session from the IPTV CS. The content delivery network interface communicates with nodes in a content delivery network to receive content for rendering by the OITF and establishes a plurality of content control sessions, at least one of the content control sessions associated with a content delivery session not received by the OITF. The processor issues content delivery session replication instructions to the IPTV CS through the IPTV CS interface in response to receipt through the user interface of the instructions to initiate content delivery session, and establishes the at least one of the content control sessions associated with a content delivery session not received by the OITF in accordance with the content control session identifier associated with the replicated session.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
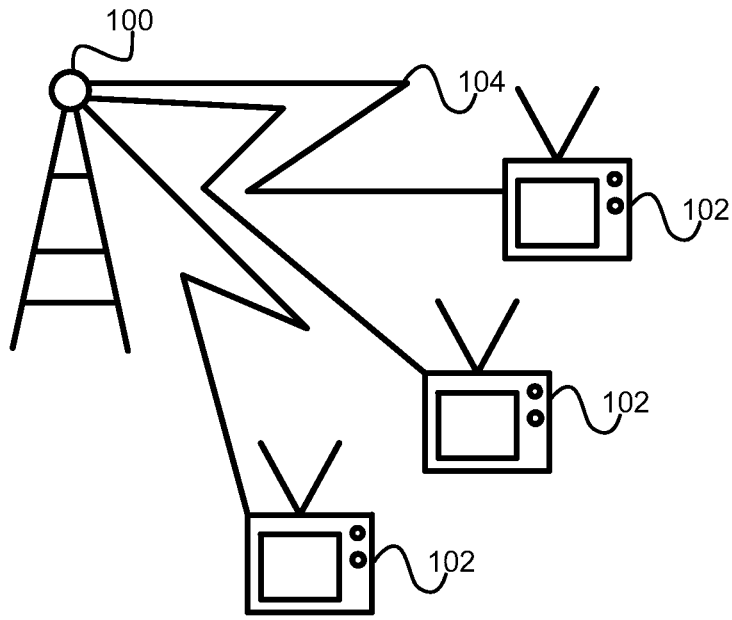
FIG. 1a illustrates a prior art television broadcasting network.
Figure 1B:
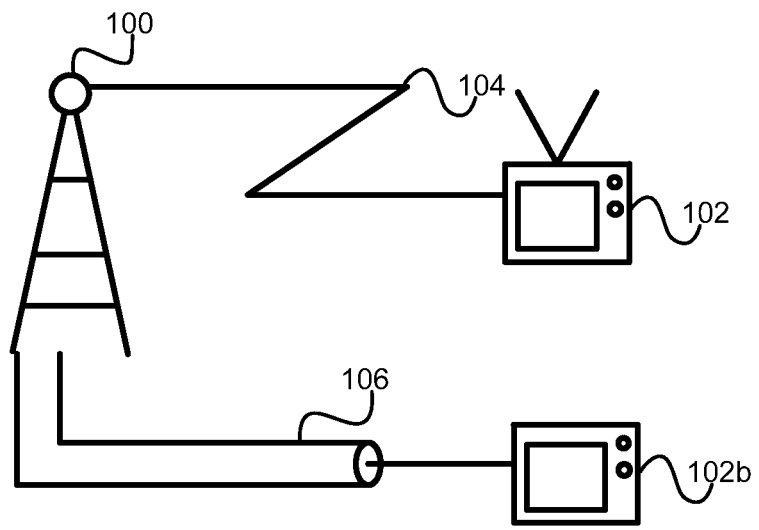
FIG. 1b illustrates a prior art television broadcasting network.
Figure 2:
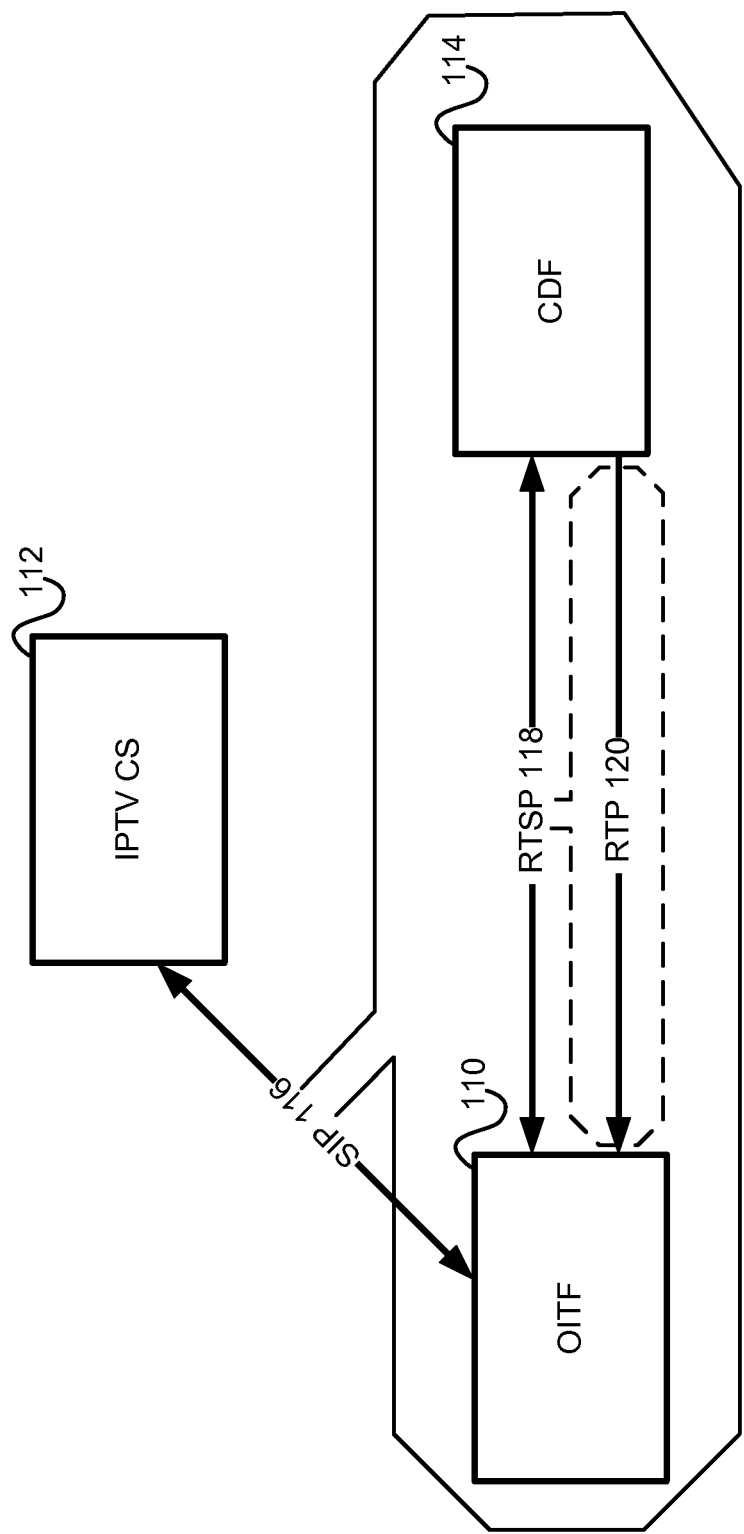
FIG. 2 illustrates a prior art IPTV session control situation.

The present invention is directed to a system and method for providing social engagement in the sharing of content.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

As noted previously, session replication is known in the art, and employs a series of SIP commands that results in the instantiation of a second session between the CDF and a second OITF. This replicated session is completely independent of the first session. Primarily, this functionality is used to allow someone viewing content delivered in a unicast session to be able to have the content displayed on two different displays. One common scenario for such a replication is a user wanting to create a second session to allow televisions in two different rooms in the same house to display a content-on-demand program such as a movie. Each of these sessions maintains independent controls, so that although the people at each television set are watching the same content, they are independently able to control its playback. The following discussions are based on the control and replication of unicast sessions. One skilled in the art will appreciate that a multicast session can be converted to a unicast session using mechanisms well known in the art and then the methods and systems of the present invention could be applied.

In the following discussions of the present invention, session replication is discussed in the context of unicast sessions. However, instead of a pure session replication, the content delivery session (typically the RTP session) will be setup between the CDF and the new OITF, but the RTSP session controlling the media control functions relevant to the replicated RTP session will be performed only from the original OITF. Thus, the first OITF will have full playback control of the session watched by the user of the second (and any subsequent) OITF. In doing so, the user controlling the first OITF session will be able to rewind, pause and otherwise control the playback experience of all users that have a remotely controlled replicated session. This allows for a number of geographically separate individuals (or groups) to participate in a socially engage viewing experience.

Before describing exemplary embodiments of how to establish such as setup, the results of such as setup will now be discussed. Many major sporting events that are televised serve as a reason for people to gather and watch the event on television. Key moments of the event can be rewound so that people can see them again. People are able to discuss the event with each other and share the same viewing experience. However, the number of people who can enjoy such a shared experience is limited by a number of factors, including the ability of people to gather in a single location. Using embodiments of the present invention, it is possible for a primary user to initiate a session, and for secondary users to be added. The RTP session of the primary user is duplicated, but the primary user is designated to receive the RTSP session identity which allows the primary user to control the media control functions relevant to the RTP session received by the secondary user. This results in the primary user controlling the session viewed by the secondary user. The primary user can then pause all the sessions at the same time, rewind all the sessions at the same time, slow down replay to all sessions at the same time, and otherwise control all the sessions in the same manner.

By controlling the RTSP sessions associated with a plurality of different RTP sessions, a single user is able to ensure that there is a common viewing experience for a geographically spread audience. Other technologies, such as chatting, teleconferencing, or even video conferencing can be used in conjunction with these embodiments to create a larger group dynamics.

The RTSP session control setup will now be explained with reference to FIG. 3 which illustrates the call flow of an exemplary embodiment. OITF1 200 is the primary user device and will add media to a secondary user device OITF2 202. OITF1 200 connects to the IMS network through the IMS Gateway (IG) 204, and is authenticated to the network by Authentication & Session Management (ASM) function 208, and interacts with IPTV Control Server (IPTV CS) 210. The Content Delivery Network (CDN) accessed by OITF1 200 includes the CDN Controller (CDNC) 212, the cluster controller (CC) 214 and the Content Delivery Function (CDF) 216.

The OITF1 200 registers with the IMS network, and initiates a streaming content session, as will be well understood by those skilled in the art. The result of this is a content delivery session 218 which is controlled by an RTSP session. When the user determines that the viewing experience should be shared, a list of devices that the session can be shared with is retrieved as shown in 220. Upon selecting OITF2 202, OITF1 200 issues an invitation 222. This invitation can be transmitted to the IPTV CS 210 through an HTTP based message 222a to IG 204, which is then relayed to ASM 208 as a SIP based re-INVITE message 222b that identifies OITF2 202. This invitation is provided to IPTV CS 210 as message 222c. The invitation 222 preferably contains information in a session description protocol (SDP) format that identifies that this invitation is to share the media experience, and not simply replicate the session. In step 224, the IPTV CS 210 initiates a PAUSE of the streamed content. One skilled in the art will appreciate that this step is optional as the initiation of a new session does not need the original session to be paused, although it usually provides an improved user experience. To initiate the PAUSE, IPTV CS 210 issues a SIP UPDATE message 224a to OITF1 200 requesting that the media be put on hold. OITF1 200 responds by issuing an RTSP PAUSE message 224b to CC 214 which relays the RTSP PAUSE message 224c to the CDF 216. CDF 216 responds with an RTSP 2000K message 224d to CC 214, which is relayed to OITF1 200 in message 224e. One skilled in the art will appreciate that CC 214 acts as an intermediary node to allow a plurality of CDF's to be deployed without needing to inform the many OITF's of each CDF. In some embodiments this intermediate node functionality can be bypassed without departing from the scope of the present invention.

After pausing the session, the IPTV CS 210 initiates a third party call control function 226 between OITF2 202 and the CDNC 212. This sets up the session between OITF2 202 and the CDN, which is completed in process 228, by involving the CDF 228 in the third party call.

After establishing the session between CDF 216 and OITF2 202, the IPTV CS 210 sends OITF1 200 sufficient information to allow OITF1 200 to control the replicated RTSP session in message flow 230. In the embodiments discussed below, such information includes the RTSP session id for the newly created session, and the address of the CDF that will stream the content. One skilled in the art will appreciate that the CDF can be identified by an address, or by other means such as through a Universal Resource Indicator (URI) that resolves to the CDF. Furthermore, a default to the original CDF can be employed so that the CDF identification is only provided if it differs from the original CDF, in such a case, the absence of CDF identification can be interpreted as defaulting to the existing CDF. If only one CDF is employed in a small network, then it is possible to omit this information as OITF1

200 will already know which CDF is used. To carry out message flow 230, IPTV CS 210 can issue a SIP 200 OK message 230a in response to the received re-INVITE 222c. Message 230a is received by ASM 208, and forwarded to IG 204 as message 230b, and then relayed to OITF1 200 as 230c. This provides OITF1 200 with the identity of the RTSP session that controls the delivery of content to OITF2 202. At this point OITF1 200 can issue an RTSP Play message 232 to resume playing the previously paused session. OITF1 200 can treat each RTP session as a unique session, and thus will transmit a plurality of RTSP PLAY messages, one for each of the remotely controlled sessions. By issuing both commands at the same time (or at essentially the same time) the playback experience for each user will be sufficiently similar and provide the desired socially engaged experience. For ease of readability and presentation, only the transmission of the RTSP command for the RTP session associated with OITF2 202 is illustrated. One skilled in the art will appreciate that one RTSP command per RTSP session is typically transmitted for the actual implementation of the discussed embodiment. In the illustrated embodiment, this is carried out using RTSP PLAY message 232a to CCC 214, which is then forwarded to CDF 216 as RTSP PLAY 232b. The CDF 216 can then reply to the CC 214 with 200 OK message 232c. At this point, the content can be streamed from CDF 216 to OITF2 202 over channel 234, which can use a protocol such as RTP. After receiving the PLAY commands for each RTP session, CDF 214 preferably resumes transmitting on session 218 as well as starting session 234.

It should be understood that is a possibility that the two media streams may not be perfectly synchronized. In some embodiments, OITF1 can issue a single command that includes both RTSP ids. The CC, in this case, would then issue separate RTSP PLAY commands for each RTSP session. In alternate embodiments that will be well understood by those skilled in the art, a single RTP stream could be controlled by OITF1 and replicated to all users engaged in the social viewing. To provide for this, a media resource function can be employed to replicate the RTP to each OITF. Such an embodiment would result in a single RTP session that engages the Media resource function in the session to replicate the stream for each secondary OITF In another embodiment, illustrated in FIG. 4, a different set of traffic flows are employed to provide similar functionality. The same network elements are illustrated for ease of comparison. As before, OITF1 200 receives content through session 218 from CDF 216, and retrieves a list of devices that the session can be shared with in step 220. In step 236, OITF1 200 invites OITF2 202 to replicate and join a session. In this exemplary embodiment, OITF 1 issues the request by sending a HTTP POST message 236a to the IG 204. Embedded in the HTTP Post message 236a is a SIP refer message identifying the session to be shared and containing a new SDP. The IG extracts this message and relays it as SIP REFER message 236b to ASM 208, which in turn forwards it to IPTV CS 210 as message 236c. The REFER message is then sent as message 236d to ASM 208 where it is forwarded to the OITF2 202 as message 236e. This completes the extending of an invitation to OITF2 202. IG 204 will provide an HTTP-based 200 OK message 236f to OITF1 200 to confirm that the invitation has been extended.

OITF1 200 will then issue a Pending message 236g to the IG 206 to instruct IG 206 that OITF1 200 is waiting for the response to the invitation. OITF2 202, upon the user accepting the invitation, transmits acceptance of the invitation by transmitting a SIP 202 OK message 236h to ASM 208, which relays it as message 236i to IPTV CS 210. IPTV CS 210 relays the acceptance to IG 204 as message 236j. The IG 204 then transmits an HTTP 200 OK message to OITF1 200 to confirm that the invitation has been accepted.

At this point, conventional session replication procedures are undertaken in step 238 to replicate the session of OITF1 200 for OITF2 202. OITF2 202 is now responsible to transmit sufficient information to OITF1 200 to allow it to control the replicated RTSP session. In the illustrated embodiment sufficient information includes the received RTSP session id and the identification of the CDF (not illustrated due to space constraints) in message flow 240. OITF2 202 transmits the RTSP session id, and CDF address to OITF1 200 through IPTV CS 210, and intermediate nodes such as ASM 208 and IG 204 through message flow 240. The message flow 240 performs two roles; it acknowledges to OITF1 200 that the replicated session has been successfully established between OITF2 202 and CDF 216, and it also transfers to OITF1 200 the RTSP session id, and CDF address for the newly established session. As is shown for the illustrated embodiment of FIG. 4, OITF1 200 sends an HTTP Post message 240a to the IG 204. This allows IG 204 to reply to the OITF1 200 when it receives the RTSP id, and CDF address. OITF2 202 transmits the RTSP ID, and CDF address in SIP NOTIFY message 240b to ASM 208, which in turn forwards the NOTIFY to IPTV CS 210 in message 240. In message 240d, IPTV CS 210 sends the RTSP id and CDF address towards OITF1 200, by sending SIP NOTIFY message 240d to ASM 208, where it is forwarded to IG 204 as message 240e. IG 204 then forwards the RTSP session id and CDF address to OITF1 200 in HTTP 200 OK message 240f. Those skilled in the art will appreciate that message 240a need not be sent in the order shown, and that these individual messages are best understood as exemplary of how step 240 can be implemented in a particular embodiment.

Upon receipt of the RTSP session ID and CDF address, playback control 232 can be undertaken as discussed above to resume playback on session 218 and initiate playback on session 234.

Figure 3:
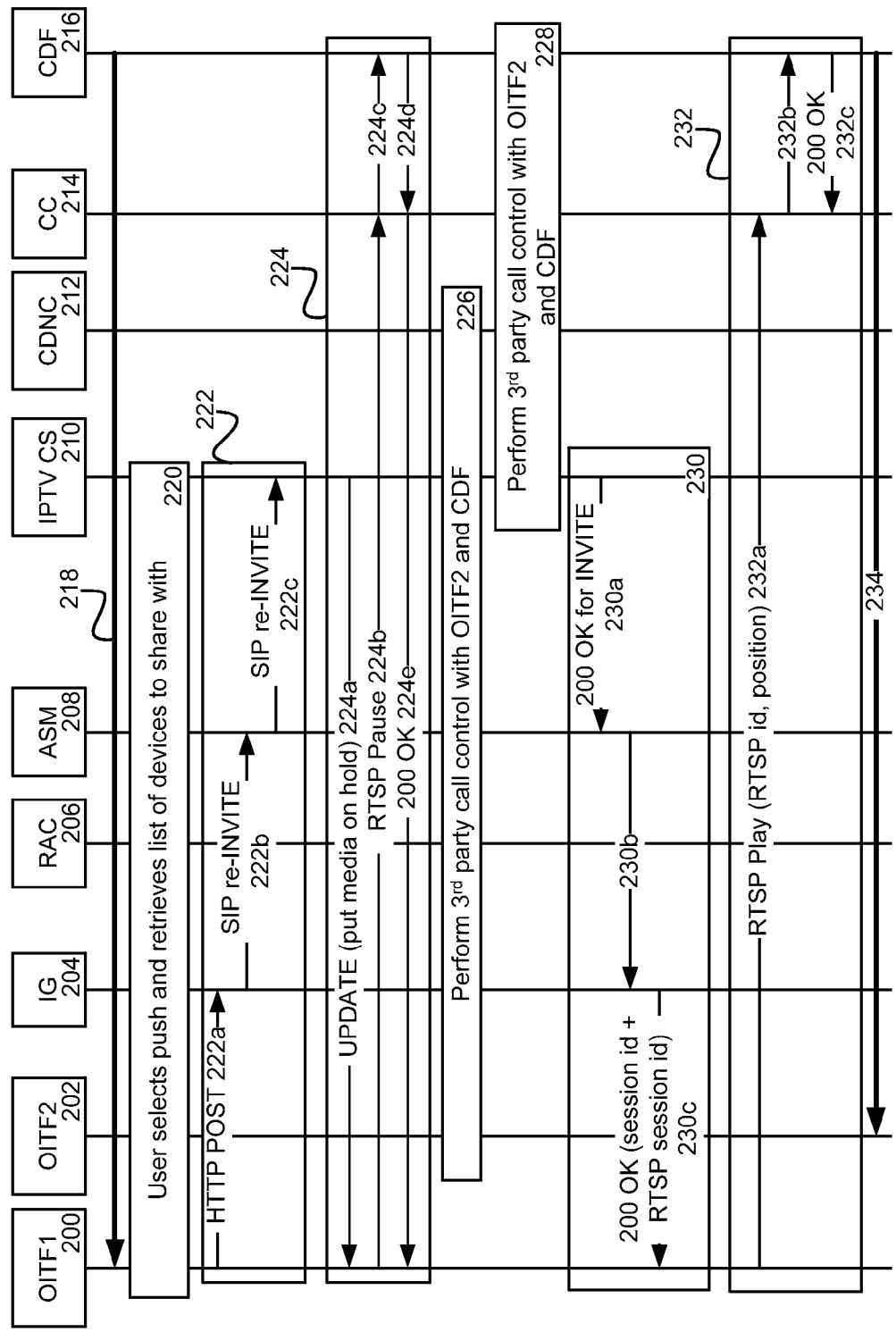
FIG. 3 illustrates a message flow for creating a remotely controlled content sharing IPTV session.
Figure 4:
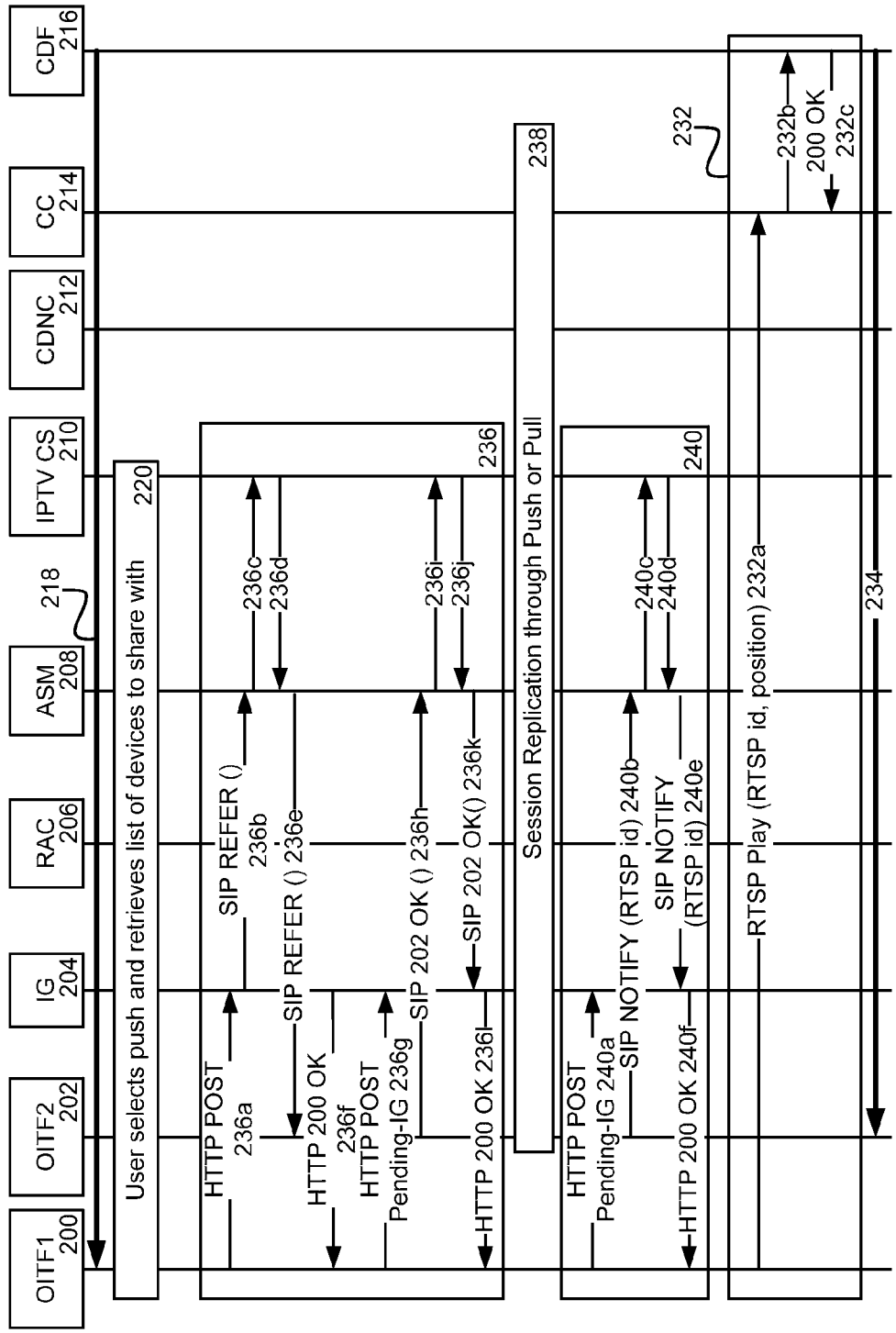
FIG. 4 illustrates an alternative message flow for creating a remotely controlled content sharing IPTV session.

One difference in the results of the method of FIGS. 3 and 4 is that as a result of the complete session replication in the flow of FIG. 4, OITF2 may be able to control his own session, while OITF1 is able to control both sessions. Using the method of FIG. 3, OITF2 can be prevented from ever obtaining the RTSP session ID, and as such will not be able to control playback. If this is considered a drawback, it can be addressed with appropriate logic in OITF2 as will be apparent to those skilled in the art.

Those skilled in the art will appreciate that after either the procedures of FIG. 3 or 4 have been carried out, the process can be repeated for any number of other OITF's.

Figure 5:
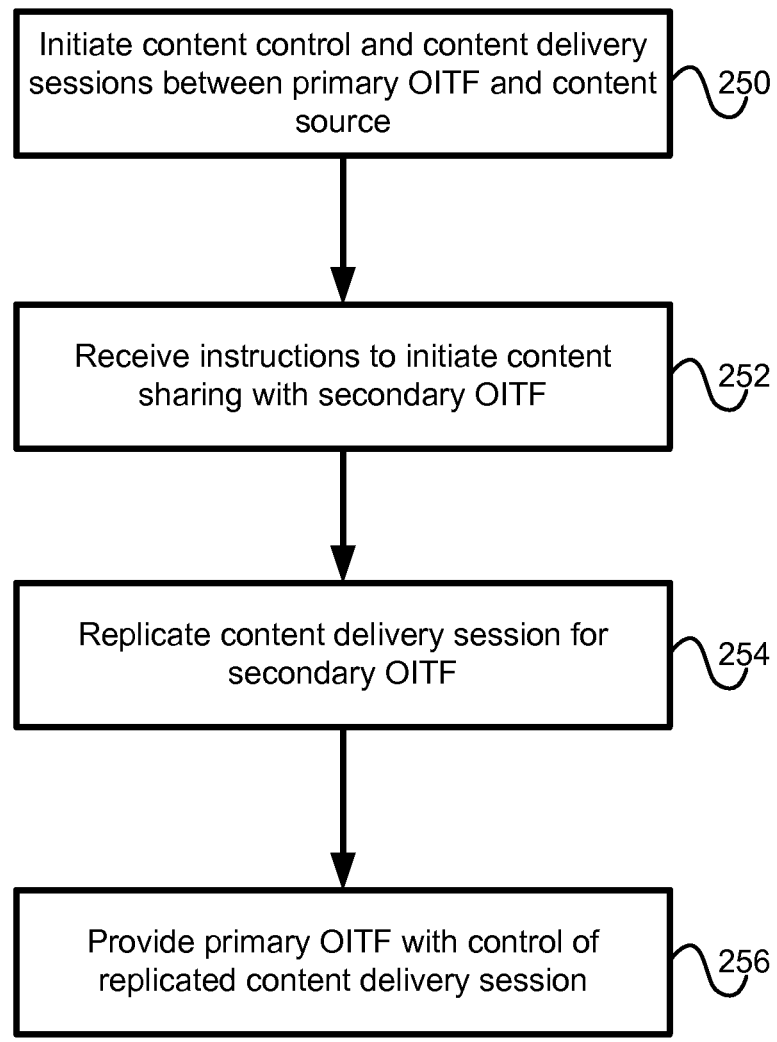
FIG. 5 is a flowchart illustrating a method for creating a remotely controlled content sharing IPTV session from an IPTV Control Server.

FIG. 5 illustrates a method of the present invention from the perspective of the IPTV CS. In step 250, IPTV CS initiates a content on demand session through which OITF1, the primary OITF, creates content control and content delivery sessions. In step 252 IPTV CS receives instructions to initiate sharing of the content delivery session with OITF2, the secondary OITF. In step 254, the content delivery session of OITF1 is replicated to OITF2. In step 256 OITF1 is provided with control of the replicated content delivery session. With reference to the methods discussed above in FIGS. 3 and 4, the step of providing OITF1 with control of the replicated content delivery session can be achieved by providing it control of the content control channel associated with the content delivery channel. Those skilled in the art will appreciate that in the above discussed message flows, RTP sessions are used for content delivery, while RTSP sessions are typically employed for content control. In other embodiments, this can be achieved by maintaining a single content control channel, and having a media resource function replicate the content delivery function upon receipt of instruction to do so.

One skilled in the art will appreciate that receiving instructions to initiate media sharing can be preceded by OITF1 requesting a list of devices that it can share its content with, as was shown in step 220 of FIGS. 3 and 4. Receipt of instructions to initiate content sharing, step 252, can include receipt of a SIP re-INVITE message as shown in FIG. 3, or it can be a request for a conventional session replication as shown in FIG. 4. One skilled in the art will appreciate that this instruction preferably includes an SDP that indicates how the media sharing is to be performed.

The replication of the media session can be carried out in a number of different methods as illustrated in FIGS. 3 and 4. Conventional session replication can be used, with the caution that the secondary OITF will be provided with the RTSP session id, and may then require that the secondary OITF include sufficient logic to prevent the user from using the RTSP session ID to carry out media control functions. Alternatively, replication of the RTP or other content delivery sessions can be performed using standard SIP techniques. The RTSP session that controls playback of the media session is then assigned to the primary OITF in step 256. Where session replication is utilized, the primary OITF can provided the RTSP session id and CDF address, (or any other set of information which allows the primary OITF to control the replicated session) which may involve the IPTV CS instructing the secondary OITF to forward the RTSP session ID and CDF address to the primary OITF. As noted above, in an unillustrated embodiment, a media resource function, typically in the content delivery network, can also be used to replicate the RTP session and direct the replicated RTP session to OITF2. In such an instance, only one RTSP session is required, as the CDF sees one RTP session.

Figure 6:
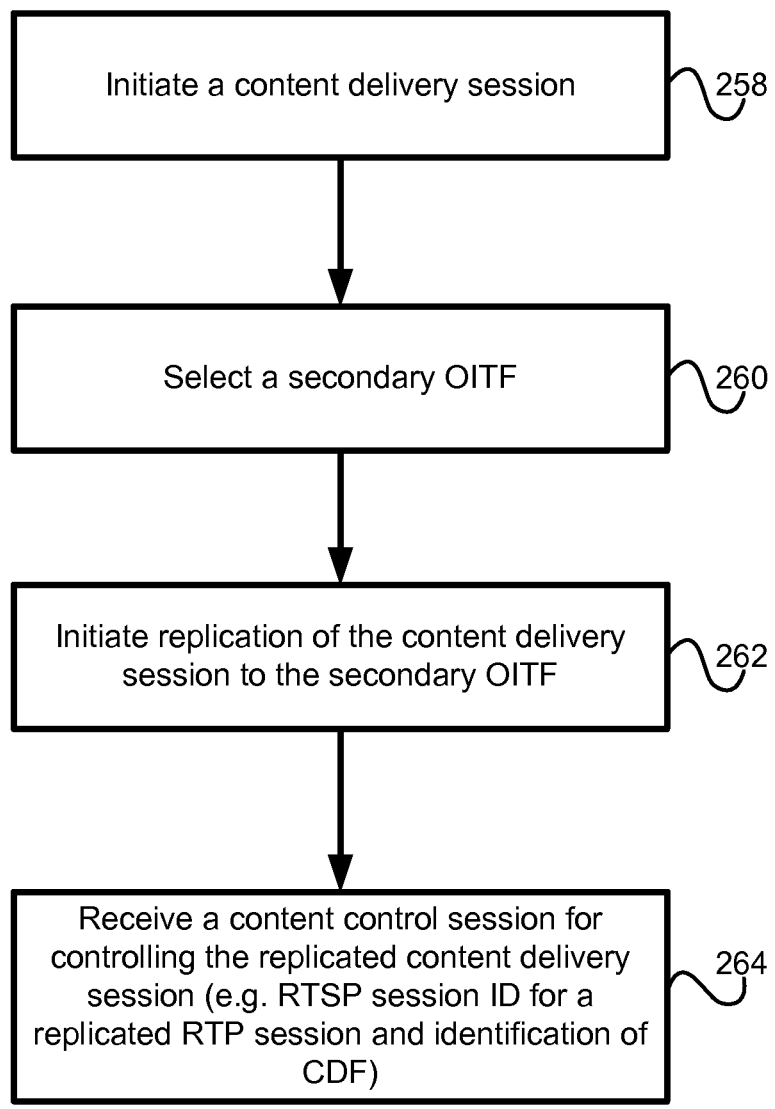
FIG. 6 is a flowchart illustrating a method for requesting the creating of a remotely controlled content sharing IPTV session from a terminal.

FIG. 6 illustrates a method of initiating the socially engaged content sharing from the perspective of the primary OITF. The primary OITF initiates a content-on-demand session with a CDN in step 258, the session typically being initiated through SIP signaling with an IPTV CS. In step 260 the primary OITF selects a secondary OITF with which to share the content on demand session. This step can involve the OITF requesting a list of OITFs from the IPTV CS, or through other mechanisms that will be apparent to those skilled in the art.

Upon selecting a secondary OITF in step 260, the primary OITF initiates session replication for the content delivery session in step 262. As noted above this can be performed through interaction with the IPTV CS, which can then replicate the content on demand session, through pushing a session replication request. This will result in a replicated RTP session delivering content to the secondary OITF, and the creation of a duplicate RTSP session that can be assigned to the primary OITF as described below. Alternatively a secondary OITF can be requested, by various means, to replicate a session using well known pulled session replication procedures. Regardless of the approach used to perform session replication, upon completion of the content delivery session replication in step 262, the primary OITF is provided the content control session corresponding to the replicated content delivery session in step 264. One skilled in the art will appreciate that in the embodiments of FIGS. 3 and 4, the primary OITF receives the RTSP session id and CDF address for the replicated RTP session. One skilled in the art will appreciate that if standard session replication was undertaken, the process is preferably modified so that the secondary OITF provides the RTSP session id and CDF address to the primary OITF (though this message will typically be routed through the IPTV CS).

Figure 7:
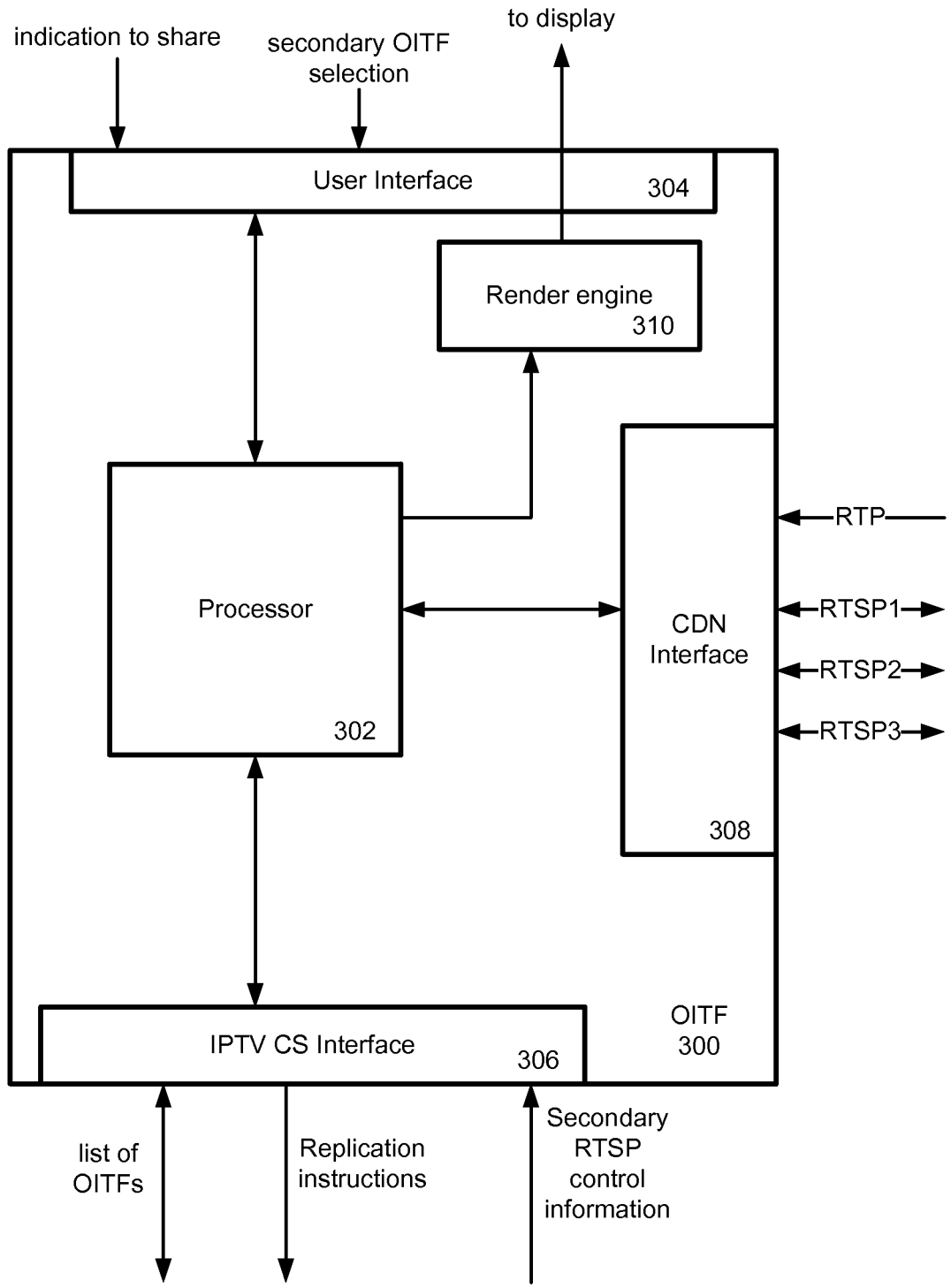
FIG. 7 illustrates a terminal according to an embodiment of the present invention.

FIG. 7 illustrates a block diagram embodiment of a primary OITF 300 of the present invention. OITF 300 includes a processor 302 which controls and interacts with a user interface 304, an IPTV CS interface 306 and a content delivery network interface 308. User interface 304 allows for the user to issue commands to OITF 300 that are then acted upon by processor 302. Such commands include the indication that media sharing is to be initiated, which when received by processor 302 results in a request issued over IPTV CS interface 306 for the list of OITF's that content can be shared with. One skilled in the art will appreciate that IPTV CS interface 306 can include a network interface for transmitting commands to be sent to the IMS network. The IPTV CS interface 306 can receive the requested list of available OITF's, and provide it to the processor 302. This list is then presented to the user, and is typically rendered by a rendering engine 310 whose output is provided to a display through user interface 304. The user can select an OITF (or a plurality of OITF's) to share the media session with, and this information is provided to OITF 300 through the user interface 304 and received by processor 302. The instructions to initiate replication are then issued through IPTV CS interface 306. At the completion of the replication process, sufficient information to control the secondary RTSP session is received through the IPTV CS interface 306. As discussed above, this can be provided as both the RTSP session id and an address associated with the CDF involved in the replicated session. This session id and CDF address is stored by the processor in an unillustrated memory, and used to communicate with the content delivery network through CDN interface 308. The RTSP session id for the replicated session is preferably paired with the RTSP session id for the original session, so that commands are issued using to each associated RTSP session at the same time. Thus, while OITF1 receives a single RTP, or other content delivery session, which is provided to processor 302 and rendered to a display by render engine 310, it can control the playback for a plurality of different RTP sessions. One skilled in the art will appreciate that in implementation, the functions of the processor 302 and render engine 310 can be provided by general purpose processors, or task specific processors, that execute instructions stored in a memory that enable the above described functionality. The interfaces 304 and 306 and 308 can be implemented through a single network connection, or through multiple network connections using standard network interfaces and being controlled by processor 302 in OITF 300.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of enabling sharing of a content session between two terminals, the method comprising:
    initiating content delivery and content control sessions for a primary terminal;
    receiving instructions from the primary terminal to share the content delivery session with a secondary terminal;
    replicating the content delivery session for the secondary terminal by performing third party call control between the secondary terminal and a content delivery network; and
    providing the primary terminal with control of the replicated content delivery session.

2. The method of claim 1 wherein the terminals are Open Internet Protocol Television Terminal Functions (OITF).

3. The method of claim 1 wherein the step of receiving instructions is preceded by:
    receiving, from the primary terminal, a request for a list of terminals with which the media session can be shared; and
    transmitting to the primary terminal the requested list.

4. The method of claim 1 wherein the step of receiving instructions includes receiving a Session Initiation Protocol (SIP) message from the primary terminal.

5. The method of claim 4 wherein the SIP message is a SIP re-INVITE message.

6. The method of claim 1 wherein the step of providing includes assigning a content control session associated with the replicated content delivery session to the primary terminal.

7. The method of claim 6 wherein the step of providing the primary terminal with control of the replicated content delivery session includes transmitting to the primary terminal an identifier for a Real Time Streaming Protocol session associated with the replicated content delivery session.

8. The method of claim 7 wherein the step of providing the primary terminal with control of the replicated content delivery session includes transmitting to the primary terminal an identification of a Content Delivery Function associated with the replicated content delivery session.

9. The method of claim 1 wherein the step of replicating the content delivery session includes instructing a media resource function to replicate the content delivery session and direct the replicated content delivery session to the secondary terminal, the replicated content delivery session being controlled by the content control session.

10. A method of enabling sharing of a content session between two terminals, the method comprising:
    initiating content delivery and content control sessions for a primary terminal;
    receiving instructions from the primary terminal to share the content delivery session with a secondary terminal;
    replicating the content delivery session for the secondary terminal by replicating all sessions associated with the content deliver session initiated with the primary terminal for the secondary terminal;
    obtaining a session identifier from the secondary terminal; and
    providing the primary terminal with the obtained session identifier and control of the replicated content delivery session.

11. A method of enabling sharing of a content delivery session with another terminal, the method comprising:
    initiating content delivery and content control sessions with a content delivery network;
    selecting a secondary terminal with which to share the initiated content delivery session;
    initiating replication of the content delivery session for assignment to the secondary terminal; and
    receiving identification of a content control session associated with the replicated content delivery session in a SIP based message from an IPTV CS containing a Real Time Streaming Protocol session id and an identification of a content delivery function associated with the replicated content delivery session.

12. The method of claim 11 wherein, the step of initiating content delivery and content control sessions includes:
    issuing a Session Initiation Protocol (SIP)-based command to an Internet Protocol Television Control Server (IPTV CS);
    having a content control session with the content delivery network established by the IPTV CS; and
    having a content delivery session with the content delivery network established by the content control session.

13. The method of claim 12 wherein, the step of selecting a secondary terminal includes:
    requesting, from the IPTV CS, a list of terminals with which the content delivery session can be shared;
    receiving, from the IPTV CS, the requested list; and
    selecting the secondary terminal from the received list.

14. The method of claim 11 wherein, the step of initiating replication includes issuing a Session Initiation Protocol based request to an IPTV CS to replicate the content control and content delivery sessions.

15. The method of claim 11 wherein, the step of initiating replication includes pushing a session replication to the selected secondary terminal.

16. The method of claim 11 wherein, the step of initiating replication includes requesting that the secondary terminal initiate a pull based session replication.

17. The method of claim 11 wherein the step of initiating replication includes requesting that the content delivery network replicate the content delivery session for the secondary terminal, and wherein the step of receiving identification includes receiving confirmation that the replicated content delivery session is controlled by the content control session.

18. The method of claim 11 wherein the step of receiving includes receiving the SIP based message in a hypertext transfer protocol message.

19. The method of claim 18 wherein the received message was initiated by the secondary terminal.

20. An Open Internet Protocol Terminal Function (OITF) device comprising:
    a user interface for receiving user instructions to initiate content delivery session sharing;
    an Internet Protocol Television Control Server (IPTV CS) interface for transmitting content delivery session replication instructions to an IPTV CS, and for receiving a content control session identifier associated with a replicated session from the IPTV CS;
    a content delivery network interface for communicating with nodes in a content delivery network to receive content for rendering by the OITF and for establishing a plurality of content control sessions, at least one of the content control sessions associated with a content delivery session not received by the OITF; and a processor for issuing content delivery session replication instructions to the IPTV CS through the IPTV CS interface in response to receipt through the user interface of the instructions to initiate content delivery session, and for establishing the at least one of the content control sessions associated with a content delivery session not received by the OITF in accordance with the content control session identifier associated with the replicated session.

* * * * *

UNITED STATES PATENT AND TRADEMARK OFFICE
CERTIFICATE OF CORRECTION

PATENT NO. : 8,452,878 B2  
APPLICATION NO. : 12/893578  
DATED : May 28, 2013  
INVENTOR(S) : Foti Page 1 of 1

It is certified that error appears in the above-identified patent and that said Letters Patent is hereby corrected as shown below:

In the Specification:

In Column 4, Line 13, delete "Open Internet Protocol Terminal Function" and insert -- Open Internet Protocol Television Terminal Function --, therefor.

In Column 6, Line 41, delete "2000K" and insert -- 200OK --, therefor.

In Column 6, Line 52, delete "CDF 228" and insert -- CDF 216 --, therefor.

In Column 7, Line 22, delete "CCC" and insert -- CC --, therefor.

In Column 7, Line 28, delete "CDF 214" and insert -- CDF 216 --, therefor.

In the Claims:

In Column 12, Line 19, in Claim 12, delete "wherein," and insert -- wherein --, therefor.

In Column 12, Line 28, in Claim 13, delete "wherein," and insert -- wherein --, therefor.

In Column 12, Line 34, in Claim 14, delete "wherein," and insert -- wherein --, therefor.

In Column 12, Line 38, in Claim 15, delete "wherein," and insert -- wherein --, therefor.

In Column 12, Line 41, in Claim 16, delete "wherein," and insert -- wherein --, therefor.

In Column 12, Line 55, in Claim 20, delete "Open Internet Protocol Terminal Function" and insert -- Open Internet Protocol Television Terminal Function --, therefor.

Signed and Sealed this  
Twenty-ninth Day of April, 2014

Michelle K. Lee  
*Deputy Director of the United States Patent and Trademark Office*